(12) United States Patent
Steinhardt et al.

(10) Patent No.: US 10,267,167 B2
(45) Date of Patent: *Apr. 23, 2019

(54) DUCTILE COMPENSATION LAYER FOR BRITTLE COMPONENTS

(71) Applicant: MTU Aero Engines AG, Munich (DE)

(72) Inventors: Erich Steinhardt, Munich (DE); Wilfried Smarsly, Munich (DE); André Werner, Munich (DE)

(73) Assignee: MTU Aero Engines AG, Munich (DE)

( * ) Notice: Subject to any disclaimer, the term of this patent is extended or adjusted under 35 U.S.C. 154(b) by 123 days.

This patent is subject to a terminal disclaimer.

(21) Appl. No.: 15/401,483

(22) Filed: Jan. 9, 2017

(65) Prior Publication Data

US 2017/0122118 A1 May 4, 2017

Related U.S. Application Data

(63) Continuation of application No. 13/963,037, filed on Aug. 9, 2013, now Pat. No. 9,551,231.

(30) Foreign Application Priority Data

Aug. 10, 2012 (EP) .................................... 12179983

(51) Int. Cl.
*F01D 1/02* (2006.01)
*F01D 5/30* (2006.01)
(Continued)

(52) U.S. Cl.
CPC ............. *F01D 5/3092* (2013.01); *F01D 5/02* (2013.01); *F01D 5/12* (2013.01); *F01D 5/3007* (2013.01);
(Continued)

(58) Field of Classification Search
CPC ............ F01D 5/3092; D05D 2300/174; F95D 2300/501; F05D 2300/174; F05D 2300/501; F05D 2300/505; F05D 2300/518
(Continued)

(56) References Cited

U.S. PATENT DOCUMENTS

| 4,921,405 A | 5/1990 | Wilson |
| 6,773,817 B1 | 8/2004 | Sagel et al. |

(Continued)

FOREIGN PATENT DOCUMENTS

| CH | 423431 A | 10/1966 |
| DE | 102005054172 A1 | 5/2007 |

(Continued)

*Primary Examiner* — Ching Chang
(74) *Attorney, Agent, or Firm* — Abel Schillinger, LLP

(57) ABSTRACT

Disclosed is a blade element of a turbomachine, in particular of a gas turbine, which comprises a fastening element (10) with which the blade element is arranged in a receptacle (11) of the turbomachine. in the region of the fastening element, the blade element has a core region (18) and an envelope region (19) which at least partially envelops the core region. The core region is formed from a blade base material which is more brittle than the envelope material of the envelope region, and the envelope region is formed by a coating. The envelope material is a blade base material which has been modified to achieve a higher ductility or is a pseudoelastic or superelastic material.

20 Claims, 2 Drawing Sheets

(51) Int. Cl.
*F01D 5/02* (2006.01)
*F01D 5/12* (2006.01)

(52) U.S. Cl.
CPC .. *F05D 2300/173* (2013.01); *F05D 2300/174* (2013.01); *F05D 2300/1723* (2013.01); *F05D 2300/501* (2013.01); *F05D 2300/505* (2013.01); *F05D 2300/514* (2013.01); *F05D 2300/518* (2013.01); *F05D 2300/702* (2013.01)

(58) Field of Classification Search
USPC .......................... 415/200; 416/219 R, 244 R
See application file for complete search history.

(56) References Cited

U.S. PATENT DOCUMENTS

| | | | |
|---|---|---|---|
| 8,360,717 | B2 | 1/2013 | Kriegl |
| 9,132,508 | B2 | 9/2015 | Dautl et al. |
| 9,551,231 | B2* | 1/2017 | Steinhardt ............. F01D 5/3007 415/200 |
| 2008/0298976 | A1 | 12/2008 | Kriegl |
| 2010/0034661 | A1 | 2/2010 | Rajagopalan |
| 2012/0201691 | A1 | 8/2012 | Dautl et al. |

FOREIGN PATENT DOCUMENTS

| | | |
|---|---|---|
| DE | 102009030398 A1 | 12/2010 |
| DE | 102009049707 A1 | 7/2011 |

\* cited by examiner

DUCTILE COMPENSATION LAYER FOR BRITTLE COMPONENTS

CROSS-REFERENCE TO RELATED APPLICATIONS

The present application is a continuation of patent application Ser. No. 13/963,037, filed Aug. 9, 2013, which claims priority under 35 U.S.C. § 119 of European Patent Application No. 12179983.7, filed Aug. 10, 2012. The entire disclosures of both applications are expressly incorporated by reference herein.

BACKGROUND OF THE INVENTION

1. Field of the Invention

The present invention relates to a blade element of a turbomachine, in particular of a gas turbine, preferably of an aero engine, having a fastening element, with which the blade element is arranged in a receptacle of the turbomachine, wherein, in the region of the fastening element, the blade element has a core region and an envelope region which at least partially envelops the core region, and wherein the core region is formed from a blade base material which is more brittle than the envelope material of the envelope region. Moreover, the present invention relates to a corresponding turbomachine having such a blade element and also to a turbomachine, in which a blade element is arranged with a fastening element in a receptacle of a turbomachine. Furthermore, the present invention relates to corresponding processes for producing blade elements and turbomachines.

2. Discussion of Background Information

DE 10 2005 054 172 A1, the entire disclosure of which is incorporated by reference herein, discloses a blade of a turbomachine, in which the blade root of the blade, which is made of a slightly ductile to brittle material, for example of a TiAl material, is provided with a ductile compensation layer, in order to reduce stress peaks upon contact of the blade root with a blade root receptacle in which the blade is arranged, so that the brittle material of the blade is protected against cracking or destruction by fracture. Alternatively, a corresponding blade root could also be produced observing very narrow tolerances, or appropriate spherical shapes could be formed in order to avoid even the occurrence of stress peaks. However, these measures are very complex, and therefore the provision of ductile compensation layers is an advantageous alternative.

However, in the case of the compensation layers, there is the problem that, under certain circumstances, the service life of the compensation layers is very low and, despite the provision of appropriate compensation layers, the stress peaks may still not be sufficiently avoided or reduced.

Accordingly, it is desirable to be able to achieve an improved reduction of stress peaks over a longer period of time in the case of components of a turbomachine which are formed from slightly ductile or brittle materials, for example blades made of TiAl materials, so that the production tolerances for these components can be reduced further and the service life is increased. In addition, it is desirable to be able to dispense with the provision of spherical structures for avoiding stress peaks. Furthermore, it is desirable to be able to avoid having to make modifications to the base materials used for solving the bearing problems, for example avoiding the cracking of blades when blade roots are arranged in blade root receptacles. Alternatively, it is desirable to make a more variable use of base materials possible, in order to thereby increase the freedom of design.

SUMMARY OF THE INVENTION

The present invention provides a blade element of a turbomachine, in particular of a gas turbine, preferably of an aero engine, wherein the blade element comprises a fastening element with which the blade element is arranged in a receptacle of the turbomachine and comprises, in a region of the fastening element, a core region and an envelope region which at least partially envelops the core region. The core region is formed of a blade base material which is more brittle than the envelope material of the envelope region and the envelope region is formed by a coating. Further, the envelope material is a blade base material which has been modified to achieve a higher ductility or is a pseudoelastic or superelastic material.

In one aspect of the blade element, the envelope material may be formed by a pseudoelastic or superelastic alloy based on Co—Ni—Al, Co—Ni—Ga, Al—Ni—Co or Ni—Mn—Ga. For example, the envelope material may be formed by Al35Ni20Co20 or Ni$_2$MnGa.

In another aspect, a wear-resistant layer may be applied to the envelope region. For example, the wear-resistant layer may be formed by a pseudoelastic or superelastic alloy or by a material based on quasi-crystals and/or the wear-resistant layer may comprise Ti60(Mn,Fe,Cr)25Si5O10, Ti45Zr38Ni17 or Al35Ni20Co20.

In yet another aspect of the blade element, the envelope region may have a compact form, or it may have a porous form.

In a still further aspect, the fastening element may be a blade root and the receptacle may be a blade root receptacle and/or the blade base material may be a TiAl material.

The present invention also provides a turbomachine, in particular a gas turbine, preferably an aero engine. The turbomachine comprises a blade element, in particular a blade element according to the present invention as set forth above (including the various aspects thereof), and a receptacle in which the blade element is arranged. The blade element comprises a fastening element with which the blade element is arranged in the receptacle of the turbomachine. Further, the blade element comprises a blade base material in the region of the fastening element. In a region of the contact surface with the fastening element, the receptacle comprises a receptacle surface which is formed from a receptacle surface material that has a higher ductility than the blade base material.

In one aspect of the turbomachine, the receptacle surface may be formed by a coating.

In another aspect, the receptacle surface may be formed by a blade base material which has been modified to achieve a higher ductility, an Ni-based alloy, a Co-based alloy or by a pseudoelastic or superelastic material.

In yet another aspect, the receptacle surface may he formed by a pseudoelastic or superelastic alloy based on Co—Ni—Al, Co—Ni—Ga, Al—Ni—Co or Ni—Mn—Ga, for example, by Al35Ni20Co20 or Ni$_2$MnGa.

In a still further aspect, the receptacle surface may have a porous form, or it may have a compact form.

In another aspect of the turbomachine, the fastening element may be a blade root and the receptacle may be a blade root receptacle and/or the blade base material may be a TiAl material.

The present invention also provides a process for producing a turbomachine, in particular a turbomachine according to the present invention as set forth above. The process comprises providing a receptacle in which a blade element can be arranged, the blade element comprising a fastening element with which the blade element is arranged in the receptacle of the turbomachine and the blade element comprising a blade base material in the region of the fastening element. The process further comprises coating by kinetic cold gas spraying, a thermal spraying process or by vapor deposition the receptacle in the region of the contact surface with the fastening element with a receptacle surface material that has a higher ductility than the blade base material.

The present invention also provides a process for producing a blade element of a turbomachine, in particular a blade element according to the present invention as set forth above. The process comprises providing a blade main body comprising a fastening element with which the blade element can he arranged in a receptacle of the turbomachine, the blade main body being formed from a blade base material, an envelope region being arranged on the blade main body by coating. The envelope region comprises an envelope material having a higher ductility than the blade base material of the blade main body and is a blade base material which has been modified to achieve a higher ductility or is a pseudoelastic or superelastic material. The envelope material is applied by kinetic cold gas spraying, a thermal spraying process or by vapor deposition.

According to the present invention, in the case of a blade element, for example of an individual blade or of a blade ring segment, of a turbomachine, which has a fastening element with a brittle core region and a ductile envelope region (compensation layer) for arrangement in a receptacle of another component, it is proposed to provide a blade base material of modified ductility or a pseudoelastic or superelastic material as the envelope material.

The provision of a blade base material of modified ductility, i.e. a material which is also already present in the core region of the blade element or of a corresponding fastening element of the blade element, makes it possible to increase the service life, since detachment of the envelope region during operation is avoided as a result of the similar formation of the envelope material and the blade base material.

The use of pseudoelastic or superelastic materials makes it possible to achieve a particularly high ductility of the compensation layer or of the envelope region, such that a strong reduction of stress peaks is ensured.

Pseudoelastic or superelastic material is understood to mean any material which can provide a high elastic deformation by appropriate phase transformations within the material, as is the case for shape memory alloys.

According to a further aspect, for which protection is sought independently of and in combination with other aspects of the present invention, the present invention additionally proposes providing the surface region of a receptacle in which a blade element is arranged, rather than the fastening element of a blade element, with a correspondingly ductile compensation layer, where the ductility of the compensation layer, i.e. of the receptacle surface material, should be higher than the ductility of the blade base material, in order to thereby make it possible to reduce stress peaks given corresponding contact between the fastening element and the receptacle.

Substantially the same materials as are also used for the ductile envelope region of a blade element are suitable for forming a ductile surface region of a receptacle. in addition, ductile nickel-based alloys or cobalt-based alloys may be provided.

Nickel-based alloys or cobalt-based alloys are to be understood as meaning alloys whose greatest constituent part is formed from nickel or cobalt.

The pseudoelastic or superelastic alloys for forming ductile compensation layers in the form of envelope regions on blade elements or ductile surface regions on receptacles can be formed on the basis of the systems cobalt-nickel-aluminum, cobalt-nickel-gallium, aluminum-nickel-cobalt or nickel-manganese-gallium. Pseudoelastic or superelastic alloys based on aluminum-nickel-cobalt are suitable in particular, since these can be used as superelastic alloys and also have a sufficient hardness in order to be able to afford wear protection in the case that a quasi-crystalline structure has been set, such that a corresponding combination of such layers with good mutual adhesion is possible. Here, an alloy Al35Ni20Co20 is suitable in particular.

A wear-resistant layer can generally be applied to the envelope region in order to increase the service life. Known wear-resistant systems are used as the wear-resistant layer, but in particular wear-resistant layers based on quasi-crystalline structures, for example the aforementioned alloy Al35Ni20Co20. However, other quasi-crystalline structures such as Ti60(Mn,Fe,Cr)25Si5O10 or Ti45Cr38Ni17 are also possible. Quasi-crystalline materials are distinguished by an ordered but aperiodic structure and have a high hardness and good oxidation resistance, and therefore they are particularly suitable as wear-resistant layers for ductile compensation layers in the present applications.

The envelope region of the blade element, which can be applied as a coating in a similar manner to the receptacle surface, can be applied just like the receptacle surface by a very wide variety of coating processes, for example by thermal processes, in particular thermal spraying processes or cold gas kinetic spraying (kinetic cold gas compaction K3 process). It is also possible to employ vapor deposition processes using chemical vapor deposition (CVD) or physical vapor deposition (PVD).

During the deposition of the layers, these can be deposited in porous or compact form. Particularly for the provision of a wear-resistant layer, the compensation layers can be deposited in compact form in the form of the envelope region or of the receptacle surface region, whereas, in the case of a porous deposition, use can be made of a lubricant for reducing the friction between the fastening element of the blade element and the receptacle.

The fastening element of the blade element can be in particular a blade root arranged in a blade root receptacle of a turbine disk, such that the receptacle is therefore formed by the blade root receptacle. The base material of the blade can be in particular a TiAl material, where TiAl material is understood to mean any material which has titanium and aluminum as constituent parts with the greatest proportions or comprises intermetallic phases such as $\alpha_2$-Ti$_3$Al or γ-TiAl. Moreover, the TiAl materials can comprise further alloying elements, such as niobium or manganese.

The specification of material systems based on certain chemical elements indicates that the materials comprise substantially these elements. In particular, the sum of the proportions can make up the predominant proportion or the individual proportions of the chemical elements named represent the greatest proportions of the material. In the material details where numerals are given in the same plane behind the symbols of the chemical elements, the numerals denote the proportions of the chemical elements in % by weight. In the case of chemical formulae with subscripted numerals, these are details relating to the respective proportions in the compound, e.g. in the case of intermetallic phases.

BRIEF DESCRIPTION OF THE DRAWINGS

The accompanying drawings show in a purely schematic manner in

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
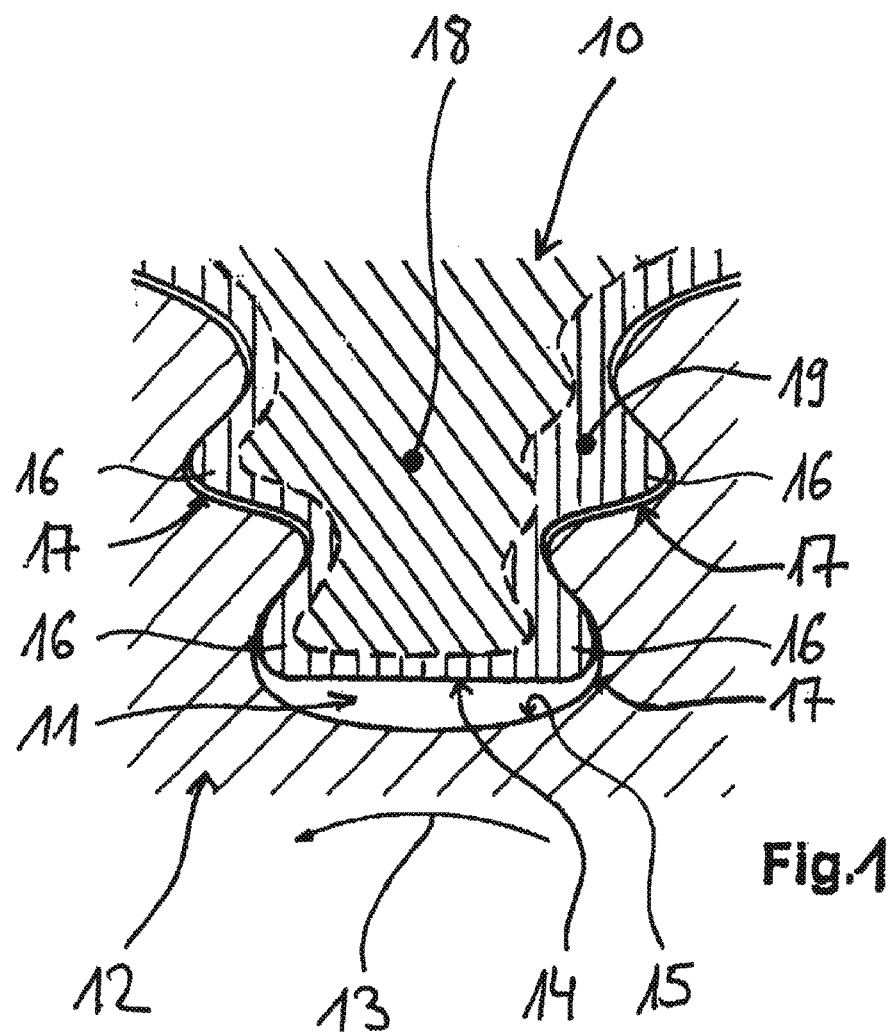
FIG. 1 a cross section through a blade root of a blade of a turbomachine which is arranged in a blade receptacle in a disk of the turbomachine.

FIG. 1 shows a schematized cross section through a fastening element 10, in the form of a blade root, of a gas turbine rotor blade, wherein the fastening element 10 of the gas turbine rotor blade is positioned in a receptacle portion 11 (blade root receptacle) of a rotor 12. During operation, the gas turbine blade rotates together with the rotor in the direction of the arrow 13 shown in FIG. 1.

The fastening element 10 of the gas turbine rotor blade has an outer contour 14 shaped like a fir tree, with an inner contour 15 of the receptacle portion 11 being adapted to the outer contour 14 of the fastening element 10. The fastening element 10 contoured like a fir tree has protrusions 16, which engage into correspondingly contoured recesses 17 of the receptacle portion 11.

Within the context of the present invention, the fastening element 10 of the gas turbine rotor blade is formed from two functionally separated regions, specifically from a core region 18 and an envelope region 19 enveloping the core region 18 on all sides. The core region 18 is accordingly embedded in the envelope region 19.

According to the invention, the core region 18 of the fastening element 10 is formed from a relatively brittle and also relatively light material having a relatively low ductility. Thus, the core region 18 can be formed from a ceramic material or from an intermetallic material. When the core region 18 is formed from an intermetallic material, it is preferably formed from a TiAl material.

According to the invention, the envelope region 19 in which the core region 18 is embedded is formed from a material having a relatively high ductility. The envelope region 19 can be formed from a metallic material which is matched to the metallic material of the rotor 12, i.e., has a similar but not identical material composition to the rotor. Thus, for example, the envelope region 19 can be formed from pseudoelastic or superelastic materials.

In the exemplary embodiment shown in FIG. 1, the envelope region 19 is formed with one layer or one ply. Alternatively, the envelope region can also be formed with a plurality of layers or a plurality of plies.

In the exemplary embodiment shown in FIG. 1, the envelope region 19 has a relatively thick form and is applied to a non-net-shape outer contour of the core region 18. The envelope region 19 of the fastening element 10 is machined in such a manner that the outer contour 14 thereof, which defines the outer contour of the fastening element 10, is matched to the inner contour 15 of the receptacle region ii of the rotor 12. In this case, the core region 18 of the fastening element 10, which is formed from the relatively brittle and also relatively light material, can have any desired contour. The envelope region 19, which is formed from a metallic material, can be adapted to the desired net shape using common machining processes.

In contrast thereto, it is also possible that the core region 18 already has a net-shape outer contour and, in terms of its dimensions, is reduced merely by the thickness of the envelope region 19. In this case, the envelope region 19 has a relatively thin form, since in this case no net-shape machining thereof is required.

In the exemplary embodiment of FIG. 1, it has been assumed that the fastening element 10 is a blade root of a gas turbine rotor blade. As already mentioned, the invention is not restricted, however, to the use on rotating rotor blades, but instead the invention can also be used on stationary guide vanes. Stationary guide vanes of this type can have a plurality of hook-like, flange-like or journal-like fastening elements, it then being preferable for each fastening element of the stationary guide vanes to be formed as described with reference to FIG. 1 for a rotor blade.

Alternatively, instead of the surface region of the blade root, it is also possible for the surface region of the blade receptacle to be coated with the ductile material. In this case, in the event of corresponding stresses the surface or coating of the blade root receptacle takes on the reduction of stress peaks in that the blade root presses into the ductile surface or coating of the blade root receptacle.

Figure 2:
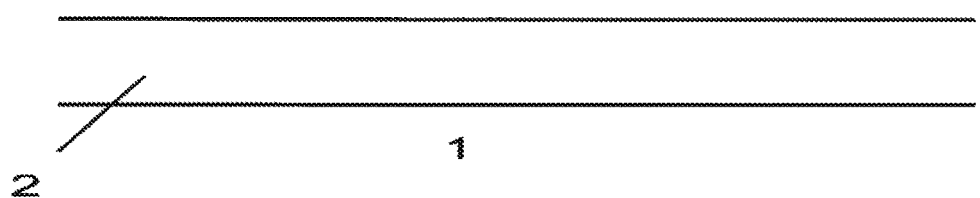
FIG. 2 a partial sectional illustration through a surface region of the blade root shown in FIG. 1; and in FIG. 3 a sectional view through a surface region of a blade root according to a further embodiment.
Figure 3:
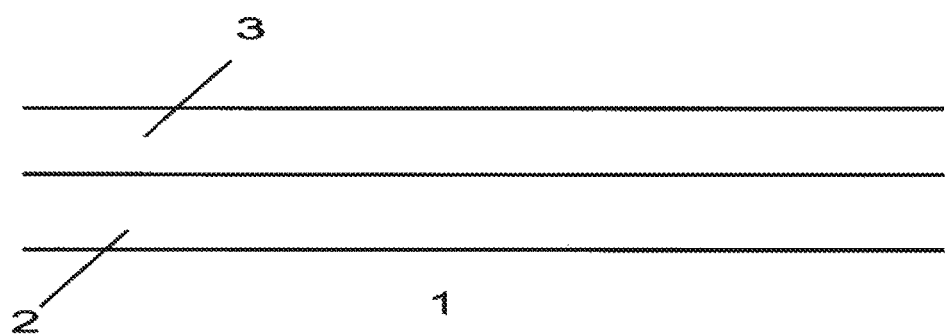

FIGS. 2 and 3 show in a purely schematic manner a corresponding structure of a surface region of the blade root or of the surface of the blade root receptacle. Reference sign 1 denotes the base material to which a compensation layer 2 made of a ductile material is applied. If the base material 1 is formed from a TiAl material, the compensation layer 2 can likewise be formed from a TiAl material, which, however, has a higher ductility than the base material 1. This can he achieved, for example, by an altered chemical composition of the TiAl material or by an appropriate selection of the deposition conditions for the TiAl material and of a suitable set microstructure.

Moreover, the compensation layer can be formed from superelastic or pseudoelastic materials based on the system Co—Ni—Al, Co—Ni—Ga, Al—Ni—Co or Ni—Mn—Ga. In particular, the compensation layer can be formed from the intermetallic phase $Ni_2MnGa$.

The compensation layer 2 can be deposited in porous form or can be in the form of a compact layer, in which virtually no pores or free spaces are formed. In the case of a porous layer, a lubricant can be applied to the surface, said lubricant reducing the friction between the blade root and the blade root receptacle and therefore counteracting wear.

Given a compact form of the compensation layer 2, a wear-resistant layer 3 can be provided, as shown in FIG. 3. Various possibilities come into consideration for the wear-resistant layer, it being possible in particular to use wear-resistant layers made of quasi-crystalline materials such as, for example, Te60(Mn,Fe,Cr)25Si5O10, Ti45Zr38Ni17 or Al65Ni20Co15. The use of Al65Ni20Co15 for the compensation layer 2 and the wear-resistant layer 3 is advantageous in particular, since a material of this type can have superelastic properties and also affords wear protection in the case that a quasi-crystalline structure has been set. This also applies to further materials based on Al—Ni—Co. A modification of alloys based on Al—Ni—Co therefore makes it possible to achieve an advantageous combination of very similar layers with wear-resistant properties where a quasi-crystalline structure has been set and the provision of a high ductility by superelastic or pseudoelastic effects. This merely requires minor modifications to the chemical composition, such that corresponding layers bond readily to one another on account of their similar chemical composition.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A blade element of a turbomachine, wherein the blade element comprises a fastening element with which the blade element is arranged in a receptacle of the turbomachine and comprises, in a region of the fastening element, a core region and an envelope region which at least partially envelops the core region, the core region being formed of a blade base material which is more brittle than an envelope material of the envelope region and the envelope region being formed by a coating, and wherein the envelope material is the blade base material which has been modified to achieve a higher ductility or is a pseudoelastic or superelastic material.

2. The blade element of claim 1, wherein the envelope material is formed by a pseudoelastic or superelastic alloy based on Co—Ni—Al, Co—Ni—Ga, Al—Ni—Co or Ni—Mn—Ga.

3. The blade element of claim 2, wherein the envelope material is formed by $Ni_2MnGa$.

4. The blade element of claim 3, wherein a wear-resistant layer is applied to the envelope region.

5. The blade element of claim 4, wherein the wear-resistant layer comprises Ti60(Mn,Fe,Cr)25Si5O10.

6. The blade element of claim 4, wherein the wear-resistant layer comprises Ti45Zr38Ni17.

7. The blade element of claim 4, wherein the wear-resistant layer comprises Al35Ni20Co20.

8. The blade element of 2, wherein the envelope material is formed by Al35Ni20Co20.

9. The blade element of claim 8, wherein a wear-resistant layer is applied to the envelope region.

10. The blade element of claim 9, wherein the wear-resistant layer comprises Ti60(Mn,Fe,Cr)25Si5O10.

11. The blade element of claim 9, wherein the wear-resistant layer comprises Ti45Zr38Ni17.

12. The blade element of claim 9, wherein the wear-resistant layer comprises Al35Ni20Co20.

13. The blade element of claim 1, wherein a wear-resistant layer is applied to the envelope region.

14. The blade element of claim 13, wherein the wear-resistant layer is formed by a pseudoelastic or superelastic alloy or by a material based on quasi-crystals.

15. The blade element of claim 13, wherein the wear-resistant layer comprises Ti60(Mn,Fe,Cr)25Si5O10.

16. The blade element of claim 13, wherein the wear-resistant layer comprises Ti45Zr38Ni17.

17. The blade element of claim 13, wherein the wear-resistant layer comprises Al35Ni20Co20.

18. The blade element of claim 1, wherein the envelope region has a porous form.

19. The blade element of claim 1, wherein the envelope region has a compact form.

20. The blade element of claim 1, wherein the fastening element is a blade root and the receptacle is a blade root receptacle.

* * * * *